C. K. WEISS.
ROOF.
APPLICATION FILED MAY 28, 1919.
1,354,360.
Patented Sept. 28, 1920.
5 SHEETS—SHEET 1.
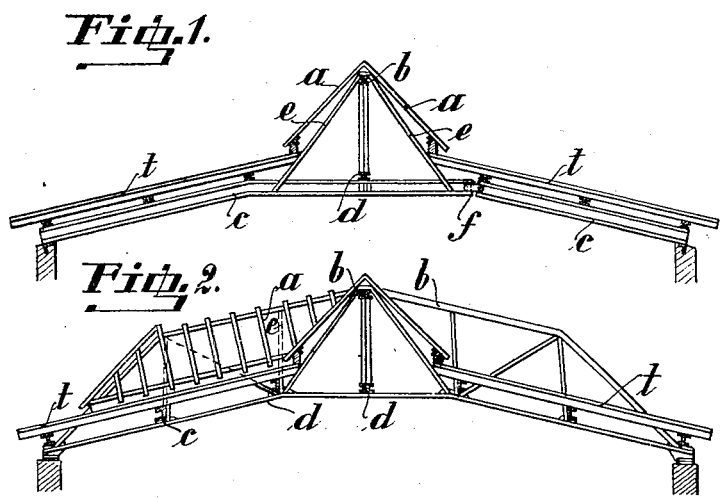

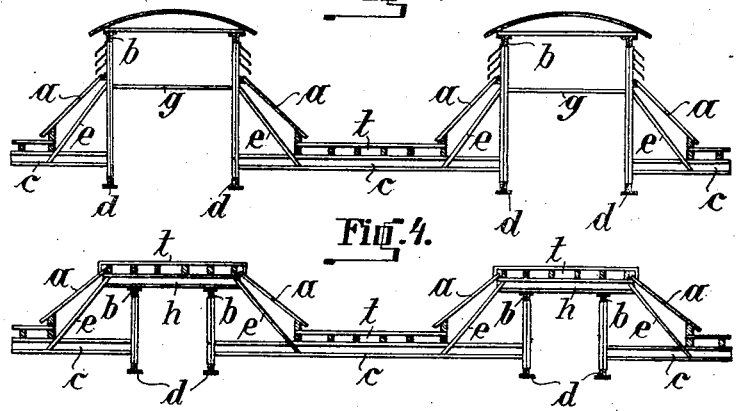
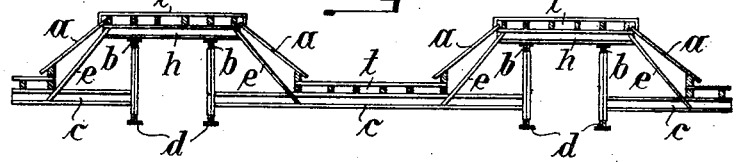
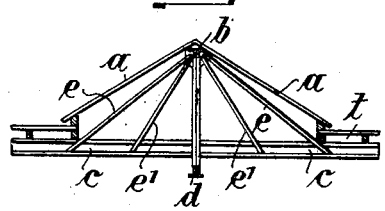
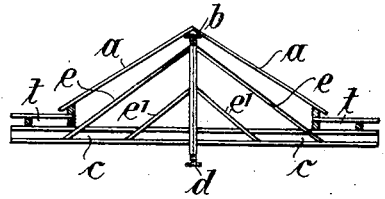
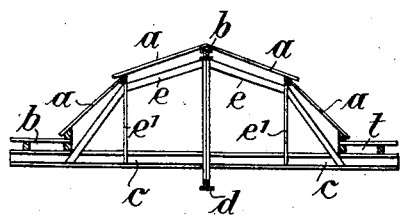
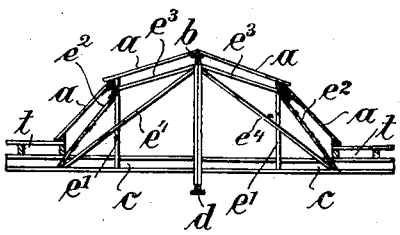
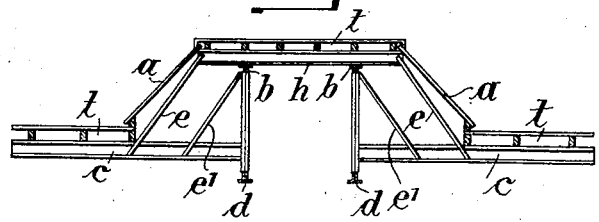

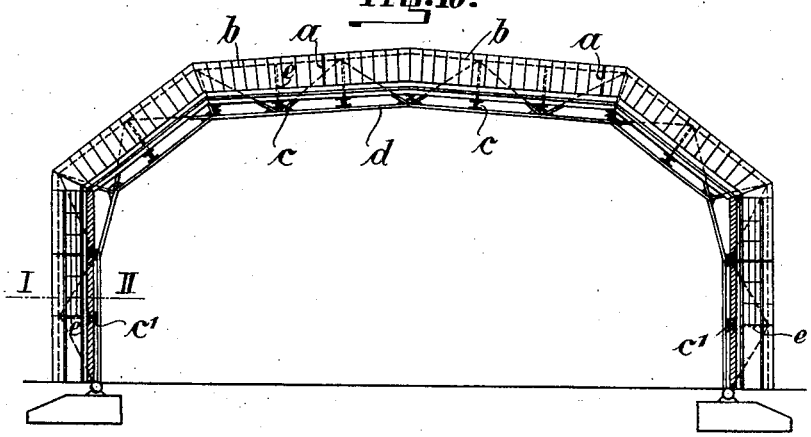
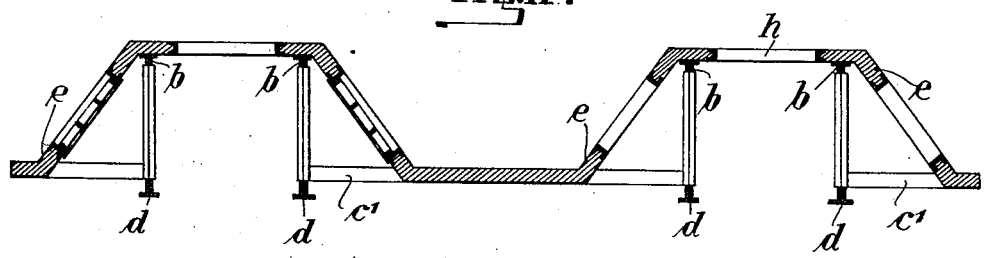
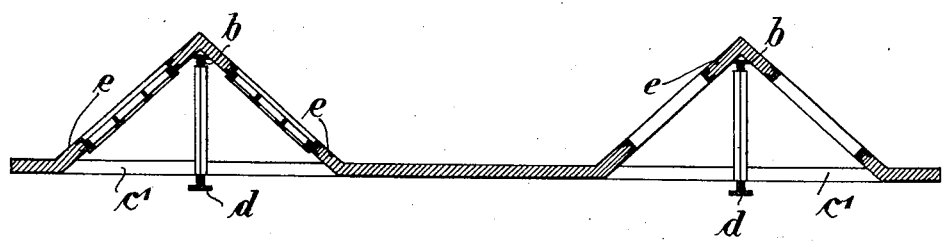

C. K. WEISS.
ROOF.
APPLICATION FILED MAY 28, 1919.

1,354,360. Patented Sept. 28, 1920.
5 SHEETS—SHEET 4.

Witnesses
Henry Ruhl
E. V. Rasmussen

Inventor
Christoph Karl Weiss
by Brest Schreuk
Attorneys

C. K. WEISS.
ROOF.
APPLICATION FILED MAY 28, 1919.
1,354,360.
Patented Sept. 28, 1920.
5 SHEETS—SHEET 5.
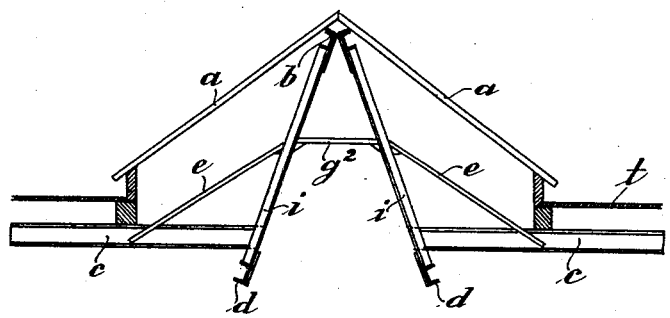
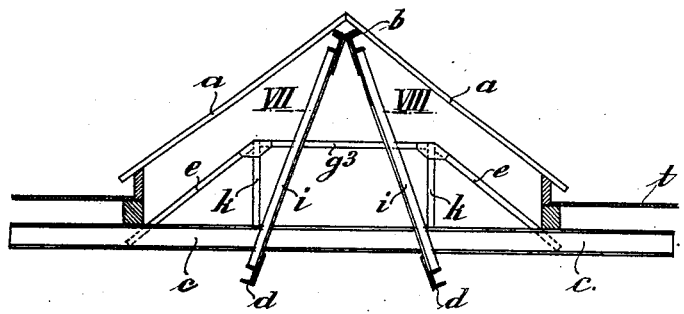
Inventor
Christoph Karl Weiss

UNITED STATES PATENT OFFICE.

CHRISTOPH KARL WEISS, OF NUREMBERG, GERMANY.

ROOF.

1,354,360.

Specification of Letters Patent.  Patented Sept. 28, 1920.

Application filed May 28, 1919. Serial No. 300,420.

*To all whom it may concern:*

Be it known that I, CHRISTOPH KARL WEISS, a citizen of the German Empire, residing at Nuremberg, in the German Empire, have invented certain new and useful Improvements in Roofs, of which the following is a specification.

The present invention refers to a roof with trusses in the sky-lights.

In roofs of this kind the trusses are usually arranged in such a manner that the purlins carrying the roof-covering are resting on the upper boom of the truss, the sky-lights being placed on the roof-covering so that the truss construction is entirely underneath the roof-covering. By such a construction the inner span of the roofed space is more or less obstructed and reduced.

The object of the invention is to construct a roof with trusses in the sky-lights in which the purlins carrying the opaque roof-covering are connected to the trusses at or approximately at the height of their lower girders, the purlins being suspended directly or indirectly from the trusses by rods arranged within the sky-light. The indirect suspension of the purlins can thus be effected by means which transmit the stresses set up in the rods to the trusses. By such special suspension of the purlins from the trusses, the bending moments are considerably reduced and the purlins may be made considerably lighter than in the known methods of construction. Moreover, the trusses may also be placed at a greater distance apart and may, due to the better utilization of the skylight space, be carried higher, whereby a further saving of building materials is effected.

It is known to arrange trusses in the interior of the sky-light structures, as for example in the Boileau-roof. But in this construction the purlins cannot be made continuous or jointed, because in order to carry the opaque roof-covering they must be connected partly to the under and partly to the upper boom of the trusses. This mode of construction requires, therefore, especially for the purlins a large expenditure of building materials. In contrast to the Boileau-roof in a roof according to the present invention a considerable amount of roof-covering materials may be saved, because in the new construction, the surface to be covered is much smaller. The influence of the wind pressure, especially in the direction at right angles to the trusses, is furthermore, much smaller in this construction than in a roof of known construction.

The invention is applicable to various forms of roofs and trusses, but is not concerned with the construction of the latter *per se*, since the trusses may be made of iron, wood, concrete etc., and may have any suitable form and construction. The purlins may also have any suitable form and may be made of any suitable material. In large buildings such as halls the advantages pointed out above are particularly important.

My invention consists also in certain novel features of construction and combination of parts described more particularly with reference to the accompanying drawings in which:

Figure 1 shows a diagrammatic cross sectional view of a roof constructed in accordance with and embodying my invention. This roof has only one truss in the sky-light which runs longitudinally along the roof.

Fig. 2 is a cross-sectional view of a roof with sky-lights arranged longitudinally and across the roof.

Figs. 3–10 are similar cross sectional views showing 8 more varieties of my roof construction with one and two sky-lights respectively.

Fig. 11 is a horizontal section along the line I—II, Fig. 10, showing a side-light construction with two trusses turned 90°.

Fig. 12 is a similar illustration but showing only truss in the side-lights.

Figs. 17 and 18 show modifications with 2 inclined trusses which have a common upper boom.

Fig. 19 is a section along line VII—VIII of Fig. 18.

The same letters of reference are used for similar parts throughout the several views.

Figure 13:
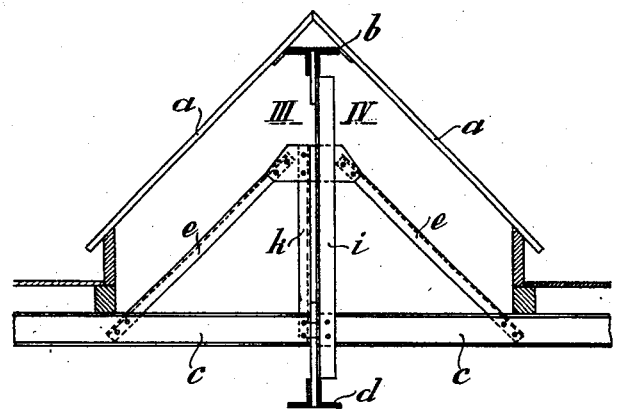
Figs. 13 and 14 show modifications of the indirect suspension of the purlins with only one truss in the sky-light.
Figure 15:
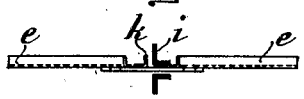
Figs. 15 and 16 are sections along line III—IV of Fig. 13 and line V—VI of the Fig. 14.

In the modification according to Fig. 1, the roof is provided with a longitudinal sky-light.

The truss preferably in the form of a frame-work with an upper boom $b$ and a lower boom $d$, as clearly shown in Fig. 2 in connection with the cross-truss there represented, is arranged in the sky-light in such a manner that it projects wholly or partly above the roof-covering $t$. The crossbars $a$ of the sky-light rest, preferably, on the upper boom $b$ of the truss. The purlins or purlin carriers $c$ are connected to the truss in the neighborhood of the lower boom $d$ or are joined to the lower boom $d$ itself and are suspended from the upper boom $b$ by means of rods $e$. The crossbars $a$ may equally well take the place of the rods $e$. Pin-joints $f$ (Fig. 1) may be provided in the purlins.

The modified construction of the roof shown in Fig. 2 has longitudinal and transverse sky-lights.

The construction of a roof with only one truss in the sky-light as shown in Figs. 1 and 2 may also be applied to a roof having two trusses in the sky-light.

Fig. 3 shows a roof with two trusses in the sky-lights. The purlins $c$ connected to the trusses near their lower boom $d$ are fastened by rods $e$ to filling members of the trusses. The horizontal stresses of the suspension rods $e$ may be taken up for example by a suitable rigid filling piece, or as shown, by a stay rod $g$. In a construction with two trusses the clear space between the trusses may be employed for mounting a traveling-crane or it may be used for any other purpose.

In the roof shown in cross section in Fig. 4 the rods $e$ are indirectly suspended from the trusses. The purlins $c$ are connected either directly to the lower booms $d$ of the trusses or to points near the lower booms, and are suspended by means of rods $e$ from a purlin $h$ placed across and resting on the upper booms $b$ of the trusses. In the example shown the additional purlin $h$ is arranged to laterally overhang the trusses, in order to reduce the bending moment exerted at the center of the purlin $h$ by the rods $e$.

In the modification shown in Fig. 3 as well as in Fig. 4 the purlins $c$ may be provided with suitable pin-joints, not shown in the drawings.

In Fig. 5 I have represented a roof in which the purlins $c$ are suspended approximately from the upper boom $b$ by means of rods $e$ and $e^1$, which are connected to the purlins at different distances from the vertical plane of the truss. The rods $e$ and $e^1$ radiate from a common point of suspension so that every purlin is carried by two rods on each side of the truss.

Fig. 6 shows another form of the roof construction in which the outer rods $e$ are suspended at their upper ends from the upper boom $b$ of the truss, whereas the upper ends of the inner rods $e^1$ are connected to one or more filling members of the truss.

In the modification shown in Fig. 7 an outer rod $e$ is suspended from the upper boom $b$ of the truss while the inner rod $e^1$ is suspended from the rod $e$. The rod $e$ may run, as shown in the example, in a broken line, or, if desired, in a straight line, as shown in Figs. 5 and 6.

As shown in Fig. 8 the outer suspension rod $e$ of Fig. 7 may be replaced by a framework $e^2$, $e^3$ $e^4$ from which is suspended the inner rod $e^1$.

The methods of construction shown in Figs. 5 to 8 may naturally also be applied to roofs with two trusses within the sky-lights.

Fig. 9 represents for example a roof with double trusses in which the outer suspension rods $e$ are connected to an additional purlin $h$ resting on the upper booms $b$ of the two trusses, and the inner rods $e^1$ are suspended from the upper booms $b$ of the said trusses.

Instead of two suspension rods $e$ and $e^1$ three or more suspension rods may be employed.

Although in most cases the sky-lights are preferably provided only on the roof or roofs proper, it may in special cases be expedient to carry the lights down along the walls of the building as side-lights, as shown in Fig. 10. In such cases the present invention can naturally be applied to the side-lights, the purlins $c$ being then replaced by bars or rails $c^1$. The invention may, however, also be applied in a similar manner in cases in which the side-lights are independent from the sky-lights or are used without the latter. In the horizontal section along line I—II, Fig. 11, I have shown side-lights in connection with two trusses, and in the horizontal section according to Fig. 12 in connection with one truss only.

When two trusses are used the suspension rods may be connected to the purlins or wall rails either in an inclined position (as shown) or at right angles. The roof covering may be applied accordingly, so as to be either inclined or at right angles to the purlins or wall rails.

The indirect suspension shown in Fig. 4 may also be effected by other means, for example as shown in Fig. 13. In this case the purlin is arranged in the sky-lights as a hanging or strut-frame so that the suspension rods $e$ are not connected to the truss or its filling members, but to special members, for example to vertical posts $k$ adjacent the verticals $i$ of the truss. This strut-framing may be single (Fig. 13), double (Fig. 14) or multiple. The horizontal strain of the rods $e$ is taken up, in the example shown in Fig. 14, by a bar or rail $g^1$.

Instead of arranging one truss or two vertical trusses in the sky-light, two trusses may be provided which are inclined to each other and have a common upper boom.

Fig. 17 shows an example of this construction. The purlins c are situated near the lower booms d of the inclined trusses and are likewise suspended by means of rods e. The horizontal strain of the rods e may be taken up, for example, by a suitable rigid filling piece i of the trusses, or as shown by a rod $g^2$.

Figure 14:
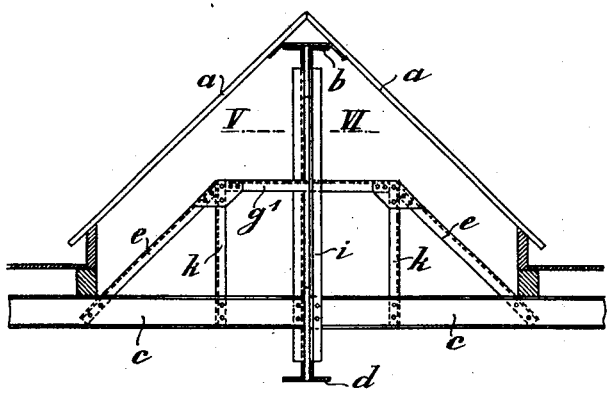
Figure 16:
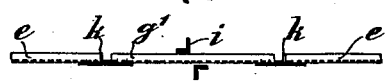

Fig. 18 shows in cross-section a roof in which the purlins c in the sky-light are provided with a special suspension device, similar to the indirect suspension illustrated in Fig. 14. The purlins c are suspended in this construction from the rods e, $g^3$ and k in such a manner that the strains of the rods e are not taken up directly by the trusses but through special rods $g^3$ and k and the purlins c. In the cross-sectional view along line VII—VIII of Fig. 19 it is shown that the rod $g^3$ is not connected to the filling piece i of the truss.

The purlins c may be continuous (Fig. 18) or not (Fig. 17) and may or may not be provided with pin-joints.

The modifications described and shown in Figs. 13–19 may naturally also be applied to sky-lights running longitudinally or transversely and longitudinally.

Furthermore, the trusses according to Figs. 13–19 may equally well be applied to the side lights shown in Figs. 10–12. The purlins c are then replaced by the wall-rails $c^1$.

The roofs shown in the drawings have saddle-shaped sky-lights; the latter may, however, have any other suitable form, for example they may be arch-shaped, and may be provided wholly or only partly with a transparent covering.

What I claim is:—

1. A building having a roof, sky-lights, roof-covering between said sky-lights, trusses in said sky-lights including upper and lower booms, purlins carrying said roof-covering between said sky-lights and connected to the trusses projecting above the roof-covering about at the height of the lower boom and suspension-rods whereby said purlins are suspended from said trusses substantially as shown and described.

2. A building having a roof, sky-lights, roof-covering between said sky-lights, trusses in said sky-lights including upper and lower booms, purlins carrying said roof-covering between said sky-lights and connected to the trusses about at the height of the lower boom and suspension-rods whereby said purlins are suspended from said trusses, each of the sky-lights having two trusses from which the suspension-rods are supported.

3. A building having a roof, sky-lights, roof-covering between said sky-lights, trusses in said sky-lights including upper and lower booms, purlins carrying said roof-covering between said sky-lights and connected to the trusses about at the height of the lower boom, suspension-rods whereby said purlins are suspended from said trusses and cross-members supported by two trusses in each of the sky-lights whereby some of said suspension-rods are indirectly connected to said trusses.

4. A building having a roof, sky-lights, roof-covering between said sky-lights, trusses in said sky-lights including upper and lower booms, purlins carrying said roof-covering between said sky-lights and connected to the trusses about at the height of the lower boom and a plurality of suspension-rods on each side of said trusses whereby said purlins are connected to said trusses at several points spaced some distance apart.

5. A building having a roof, sky-lights, roof-covering between said sky-lights, trusses in said sky-lights including upper and lower booms, purlins carrying said roof-covering between said sky-lights and connected to the trusses about at the height of the lower boom and suspension-rods whereby said purlins are suspended from said trusses, the sky-lights containing the said trusses and the said suspension-rods being carried down along the walls of the building.

In testimony whereof I hereunto affix my signature in the presence of two witnesses.

CHRISTOPH KARL WEISS.

Witnesses:
GEORG NOHL,
CUNNOT HAMPEL.